A. C. LINDGREN.
WHEELED PLOW.
APPLICATION FILED JUNE 14, 1911.
1,044,204.
Patented Nov. 12, 1912.
2 SHEETS—SHEET 2.
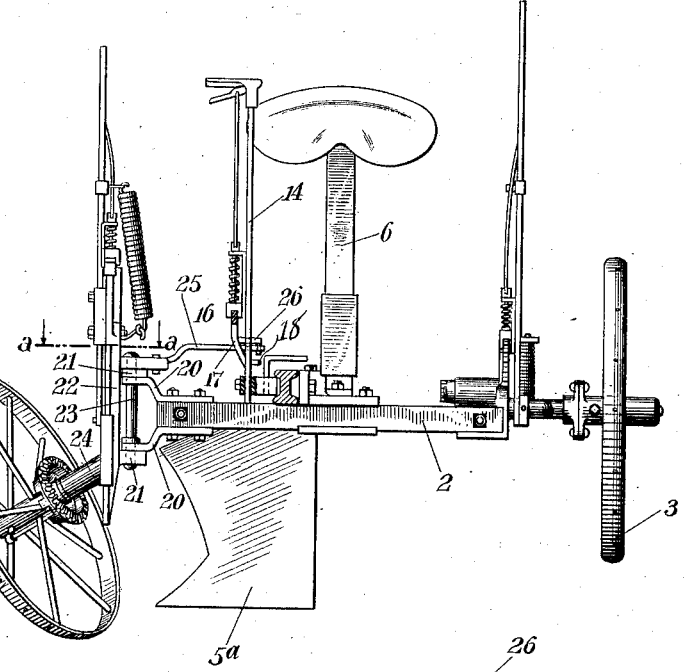
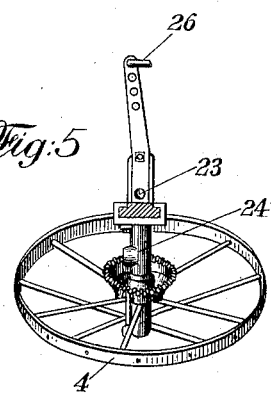
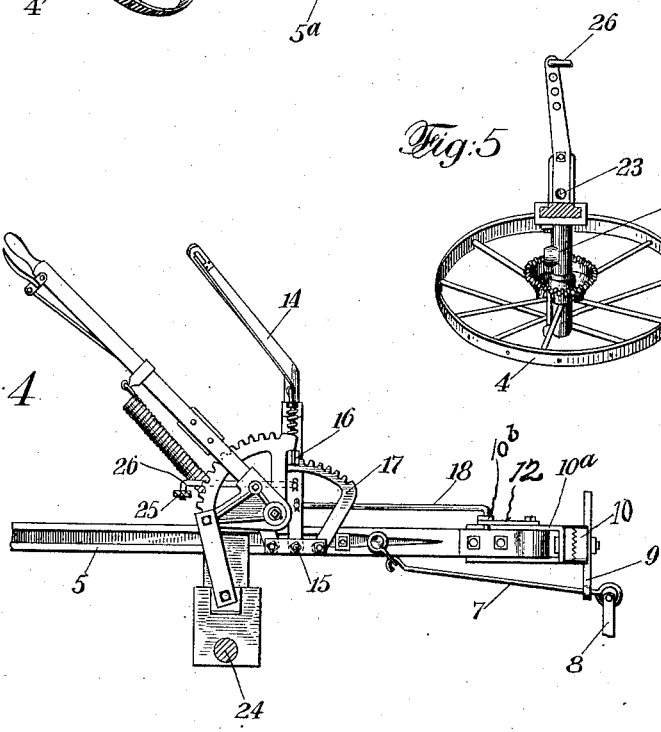

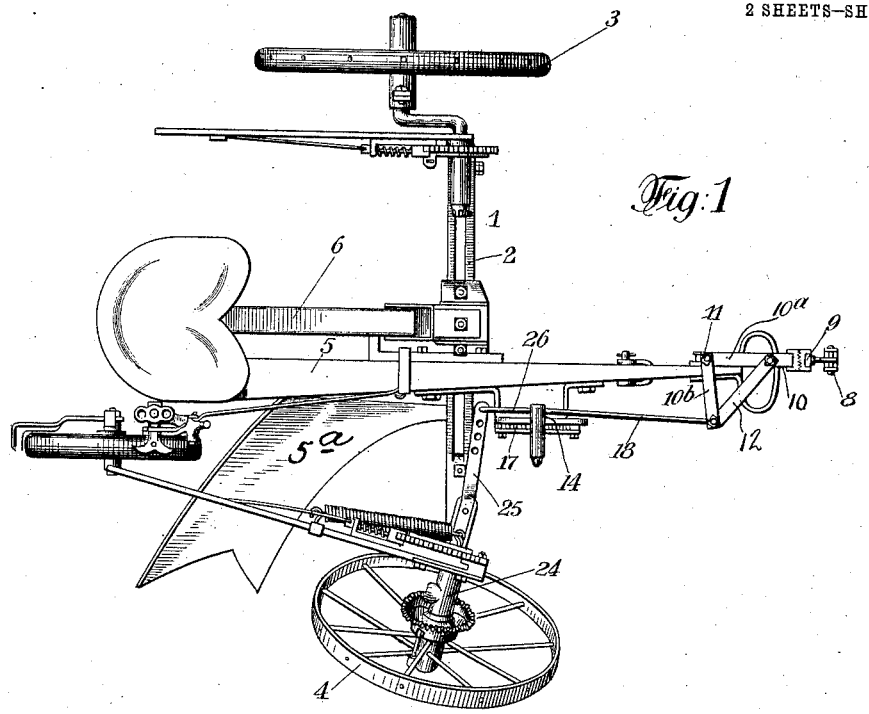
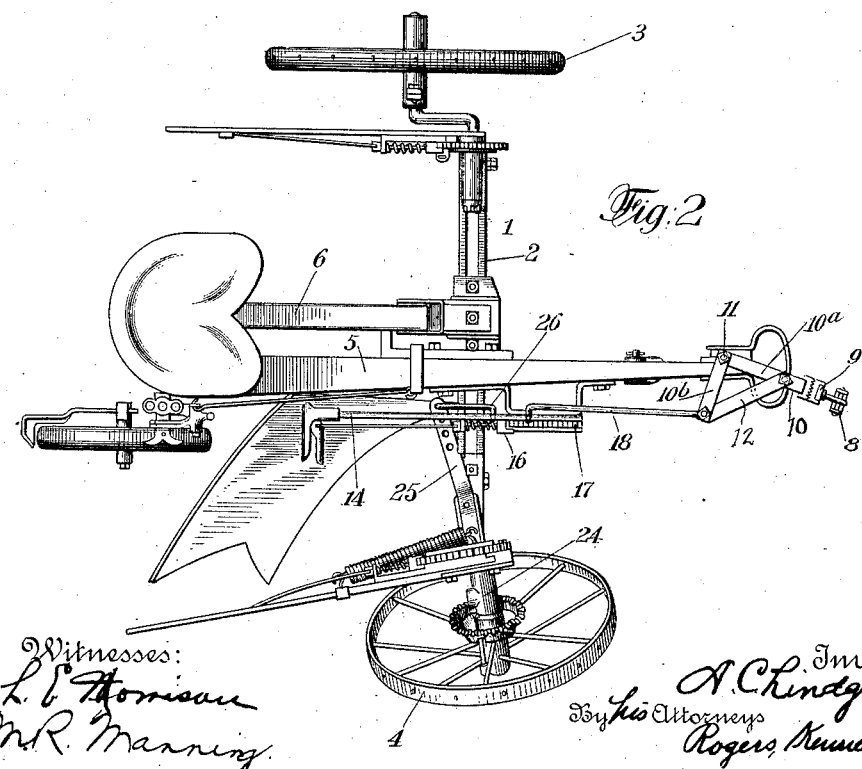

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

WHEELED PLOW.

1,044,204.   Specification of Letters Patent.   Patented Nov. 12, 1912.

Application filed June 14, 1911. Serial No. 633,059.

*To all whom it may concern:*

Be it known that I, ALEXUS C. LINDGREN, a citizen of the United States, residing at Moline, in the county of Rock Island and State of Illinois, have invented certain new and useful Improvements in Wheeled Plows, of which the following is a specification, reference being had therein to the accompanying drawing.

This invention relates to wheeled plows and other agricultural implements in which a furrow wheel travels in one of the previously made furrows and serves to guide the plow so that the furrows will be parallel and equally spaced.

It frequently happens that the draft team pulls stronger to furrowward than to landward and vice versa, the result being that the plow will not take "land" enough in one case and will take too much "land" in the other case. It has been proposed in order to correct this objectionable action and to enable the driver to control the direction of cut and width of the furrow, to provide for an adjustment of the plow clevis to the right or left with reference to the beam, the adjustment of the clevis to the right causing the beam to shift to the left and the point to pursue a corresponding direction, and the adjustment of the clevis to the left causing the plow beam to shift to the right and the point to be correspondingly moved. In practice, however, it has been found that while this mechanism will answer satisfactorily for certain kinds of work, for other kinds of work it is found that the deflection of the plow point one way or the other to correct improper action does not respond to the adjustment of the clevis as quickly and as promptly as is desirable.

The aim of the present invention is to provide for a prompt and quick deflection of the plow point when the clevis is adjusted, and with this end in view my invention consists in providing for the adjustment of the furrow wheel in unison with the clevis but in a direction opposite the movement of the clevis, the result being that if for instance the draft is pulling so as to draw the plow away from the land, and the clevis is adjusted furrowward, the furrow wheel being shifted simultaneously landward will, by its guiding action, assist in the deflection of the plow landward and cause an instant response in the movement of the plow to the adjustment of the clevis. If on the other hand the clevis is adjusted landward to cause the plow point to take less "land", then the furrow wheel will be turned furrowward and by its guiding action will assist in the deflecting action of the clevis and will instantly cause the point to deflect in a furrowward direction.

The invention consists also in the details of construction and combination of parts hereinafter described and claimed.

In the accompanying drawings: Figure 1 is a top plan view of a plow having my invention embodied therein, the clevis being shifted toward the land so as to cause the front of the beam to be drawn furrowward, and the furrow wheel being turned furrowward or in a direction opposite the adjusted position of the clevis. Fig. 2 is a similar view with the parts adjusted to the opposite position to cause the plow to take more "land." Fig. 3 is a transverse vertical sectional elevation of Fig. 1. Fig. 4 is a side elevation of the plow. Fig. 5 is a plan section on the line $a$—$a$ of Fig. 3.

1 represents a frame consisting mainly of a horizontal transverse frame bar 2 supported at one side by a land wheel 3 and at its opposite side by a furrow wheel 4. Between its ends the frame gives support to a fore and aft extending plow beam 5, carrying a mold board plow $5^a$. Alongside the plow beam is arranged a seat standard 6 supporting the usual driver's seat.

Near its forward end the plow beam has linked to its under side so as to swing horizontally, a forwardly extending draft bar 7, provided at its front end with a clevis coupling 8, to which the draft beam is adapted to be hitched. The forward portion of the bar 7 passes through an opening in the lower end of a vertical arm 9 fixed to the forward end of a frame 10 pivoted to the forward end of the beam by means of a vertical bolt 11, whereby the said frame may be swung to the right or left and by such swinging movements will correspondingly shift the clevis with relation to the beam. The frame 10 consists of a U-shaped member $10^a$ embracing the front end of the beam and pivoted thereto at its rear end by the bolt 11, which member is provided with a laterally extending arm 10ᵇ braced to the member by a strap 12 connecting the end of the arm with the front end of the U-shaped member. By the construction described it will be seen that by the movement of the frame 10 to the right or left on its pivoting bolt, the clevis and draft bar will be correspondingly shifted with reference to the beam, whereby the draft will have a tendency to deflect the beam laterally in one direction or another as the case may be.

The shifting movements of the clevis are controlled by an adjusting hand lever 14 pivoted at its lower end, as at 15, to the side of a bracket plate fixed to the plow beam, the said lever being provided with a locking dog 16 adapted to engage teeth on a segment plate 17 fixed to and rising from the said bracket plate. This lever is connected with the swinging frame 10 by means of a fore and aft extending rod 18, pivoted at its rear end to the lever and pivoted at its forward end to the point of junction of the arm 10ᵇ with the strap 12. By this construction and arrangement it will be seen that when the hand lever is drawn to the rear, the frame 10 will be swung on its pivoting bolt so that its forward end will shift to the right or furrowward, and when the hand lever is pushed forward the frame will be swung in an opposite direction.

In order that the furrow wheel may be turned in unison with the shifting of the clevis and in an opposite direction, I so mount the wheel on the frame that it may be turned or swiveled around a vertical axis, and I so connect the wheel mounting with the clevis adjusting lever that when this lever is shifted to adjust the clevis, it will also adjust the wheel. The mounting of the wheel and its connection with the clevis adjusting means to effect this action may be in a variety of forms, but I prefer to adopt the construction shown, as in practice it has been found to answer satisfactorily the ends to be attained. The invention in this respect, therefore, is intended to comprehend all means for coöperatively connecting the adjustable clevis with the adjustable furrow wheel, whereby an adjustment of one of these parts in one direction will be followed by an adjustment of the other part in an opposite direction.

On reference to Figs. 3 and 4 it will be seen that the end of the transverse frame bar 2 on the furrow side is provided with oppositely extending ears 20—20, which are embraced between lugs 21—21 projecting inwardly from an upright frame 22, a vertical pivoting bolt 23 being passed downwardly through the said lugs and ears and serving to pivotally connect the upright frame with the transverse frame of the machine in such manner that the upright frame may rock on a vertical axis with reference to the machine frame. The upright frame carries near its lower end a downwardly inclined stub axle 24 on which the furrow wheel 4 before alluded to is mounted. Extending inwardly from the upright frame is a horizontal arm 25, which is operatively connected with the hand lever 16 by means of a forwardly extending link 26 jointed at its rear end to the said arm and at its front end to the said lever, the arrangement being such that the movement of the lever on its axis will shift the arm forward and backward and rock the upright frame on its vertical axis and correspondingly shift the furrow wheel so as to turn its forward side out or in as the case may be. The relation of the clevis to the furrow wheel and the parts operatively connecting them is such that when the clevis is adjusted so as to hold the draft bar in the line of travel or in the longitudinal direction of the beam, the furrow wheel will as shown in Fig. 1, be inclined at its forward portion slightly furrowward, this position of the wheel in relation to the position of the clevis causing the plow to point straight forward and longitudinally of the beam. If the draft team, when the parts are thus adjusted, pulls too strong to the right or in a furrowward direction, unless some means were provided to prevent it, the plow will tend to point furrowward and will not take the proper amount of "land" to properly space and form the furrow relative to the preceding furrows. To correct this and to cause the plow to take more "land," the driver pulls the hand lever rearwardly, by which action the clevis will be shifted on its axis to the right, as shown in Fig. 2, and the furrow wheel will be shifted on its upright axis in the opposite direction. The pull of the team now, with the clevis in its new position, will tend to throw the forward end of the beam to the left or toward the land, and this will correspondingly shift the plow point. This action, however, will be materially facilitated and accelerated by the inclination of the furrow wheel toward the land, the furrow wheel acting in this inclined position to track toward the land and guide the plow correspondingly. The plow will be thus caused to take more "land" and follow properly in line parallel with and evenly spaced from the line of the preceding furrow. If on the other hand, the draft team pulls too strongly landward and causes the plow to take too much "land," then the driver will push the land lever forwardly, thereby shifting the clevis toward the land and the furrow wheel furrowward. The pull of the draft when the parts are thus shifted, will tend to swerve the beam furrowward and correspondingly shift the plow point, and this action will be facilitated and accelerated by the furroward inclination of the furrow wheel, whereby the plow point will take less "land" and the inaccuracy be corrected.

The furrow wheel is shown as being so mounted on its upright carrying frame that it may be adjusted vertically as is usual in wheeled plows; and the land wheel is also shown as being provided with suitable means for effecting its vertical adjustment. These details, however, constitute no part of the present invention, which invention covers broadly the coöperation of the adjustable clevis with the furrow wheel in such manner that these members will be adjusted together substantially in unison, but in opposite directions. It is manifest, therefore, that the details of construction for carrying this idea into effect may be variously modified without departing from the limits of my invention; and it is further to be understood that the invention is not limited to any specific form or relation of the parts, except in so far as such limitations are specified in the claims.

Having thus described my invention, what I claim is:

1. In a wheeled plow, the combination of a shiftable draft device, front and rear furrow wheels for supporting the plow, the front wheel being shiftable to change its inclination to the line of travel, and means for shifting the draft device and front furrow wheel simultaneously in opposite directions and for holding them in their shifted position.

2. In a wheeled plow, the combination of a shiftable draft device, front and rear furrow wheels for supporting the plow, the front furrow wheel being shiftable, and operative connections between the draft device and front furrow wheel serving when one of said parts is moved in one direction to shift the other part in the opposite direction and means for holding said parts in position.

3. In a wheeled plow, the combination of a horizontally adjustable clevis, front and rear furrow wheels for supporting the plow, the front furrow wheel being adjustable to change its inclination to the line of travel, and operative connections between the clevis and front furrow wheel serving to shift them in unison respectively in opposite directions and means for holding them in their shifted position.

4. In a wheeled plow, the combination of a horizontally swinging clevis, front and rear furrow wheels for supporting the plow, the front furrow wheel being movable to change its inclination to the line of travel, a lever, and devices connecting the lever with the clevis and with the front furrow wheel, said devices acting when the lever is actuated to move said parts in unison respectively in opposite directions and means for holding said parts in position.

5. In a wheeled plow, the combination of a horizontally movable clevis, a lever for moving the same, front and rear furrow wheels for supporting the plow, the front furrow wheel being movable bodily to change its inclination to the line of travel, and operative connections between the front furrow wheel and lever acting to move the wheel in a direction opposite the movement of the clevis and means for holding said parts in position.

6. In a wheeled plow, the combination of a plow beam, a clevis shiftable in relation thereto, a supporting wheel also shiftable in relation to the beam, and means for simultaneously adjusting said clevis and wheel and holding them in such manner as to cause the plow beam to be shifted at its front in a direction opposite to that in which the clevis is shifted.

7. In a wheeled plow, the combination of a plow beam, a clevis shiftable in relation thereto, a supporting wheel also shiftable in relation to the beam, and connections between the clevis and supporting wheel whereby they may be adjusted simultaneously and held in such manner as to cause the plow beam to be shifted at its front in a direction opposite to that in which the clevis is shifted.

In testimony whereof I have affixed my signature in presence of two witnesses.

ALEXUS C. LINDGREN.

Witnesses:
L. C. BLANDING,
JAMES J. LAMB.

Copies of this patent may be obtained for five cents each, by addressing the "Commissioner of Patents, Washington, D. C."